Patented Feb. 12, 1929.

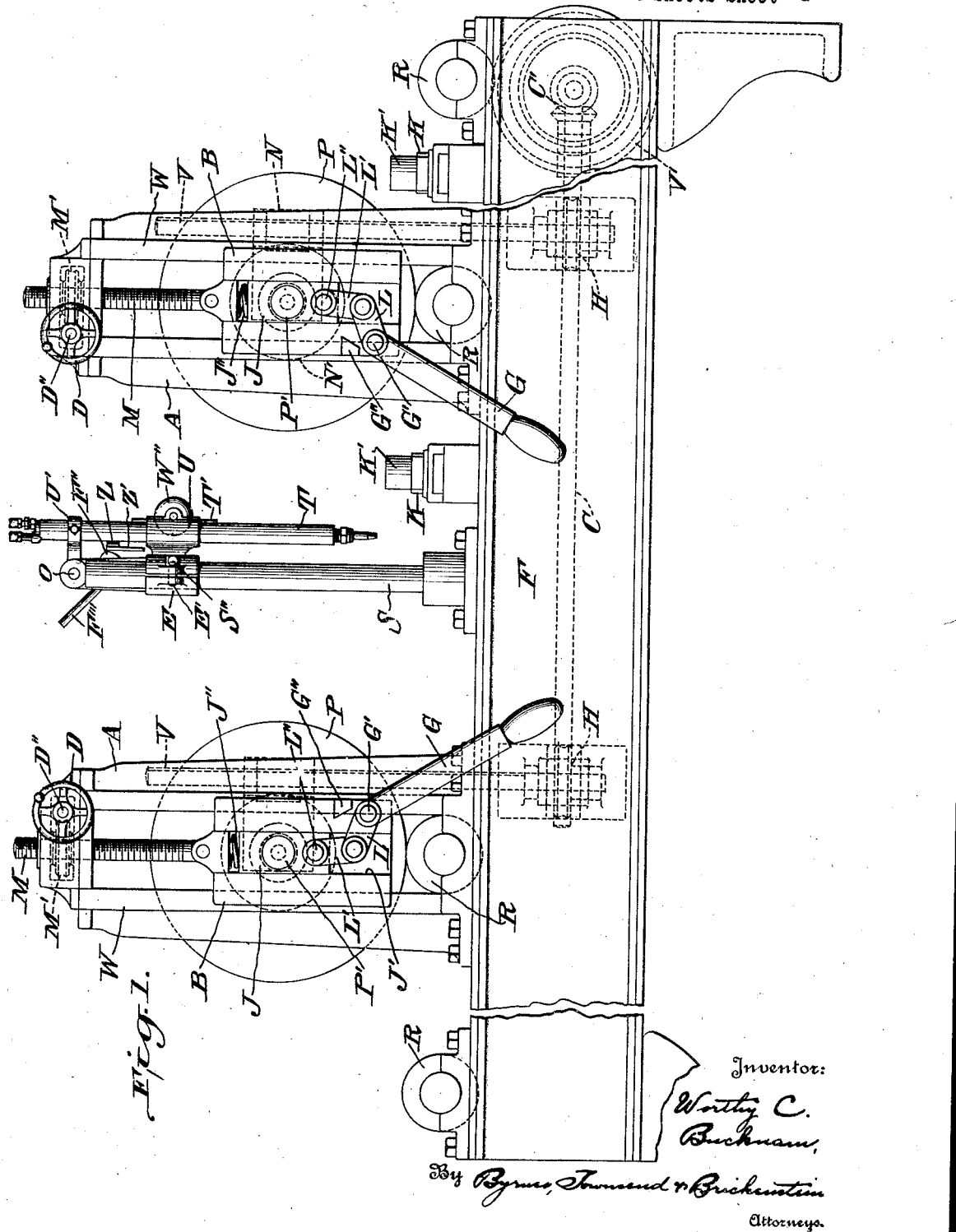

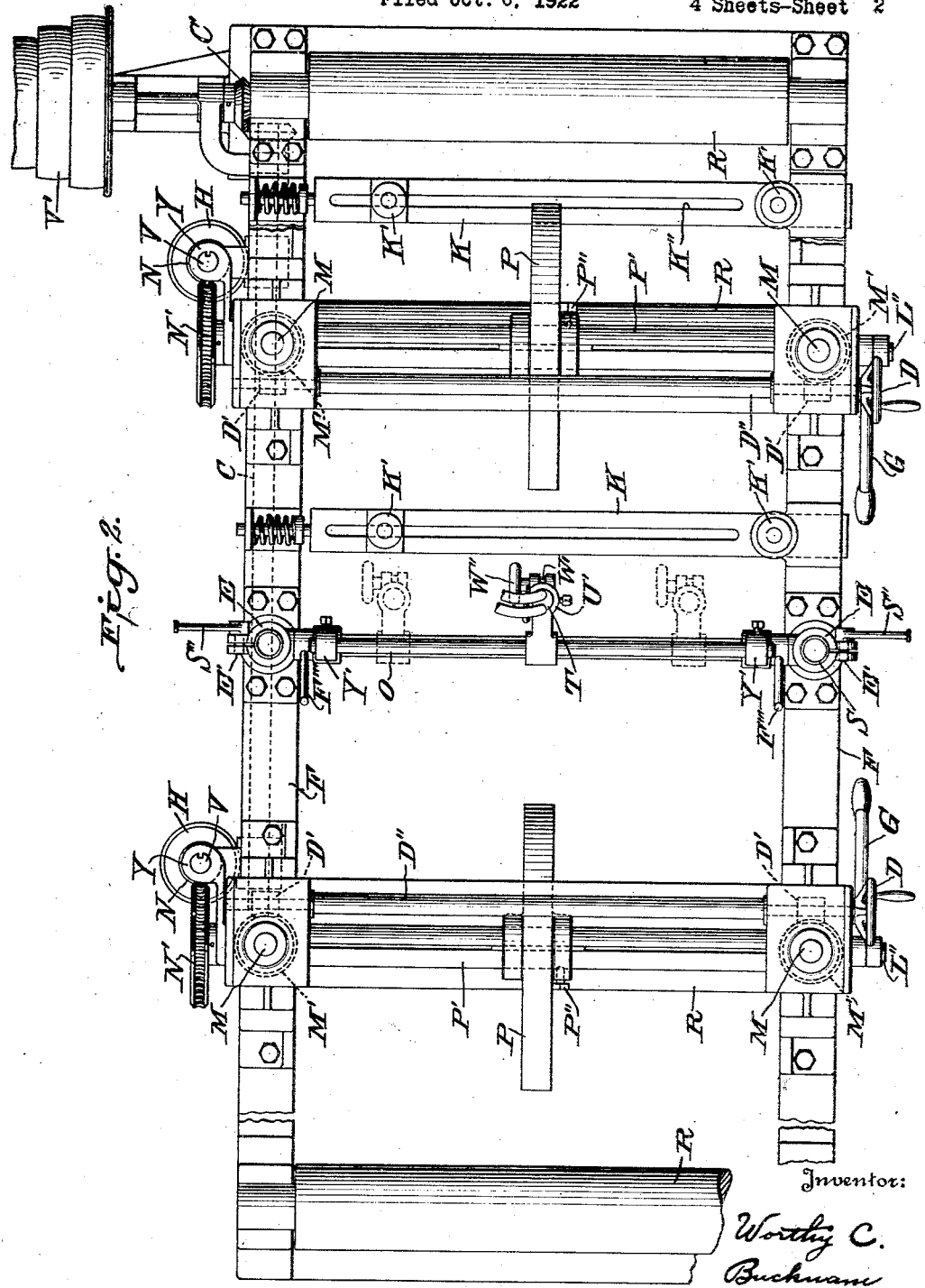

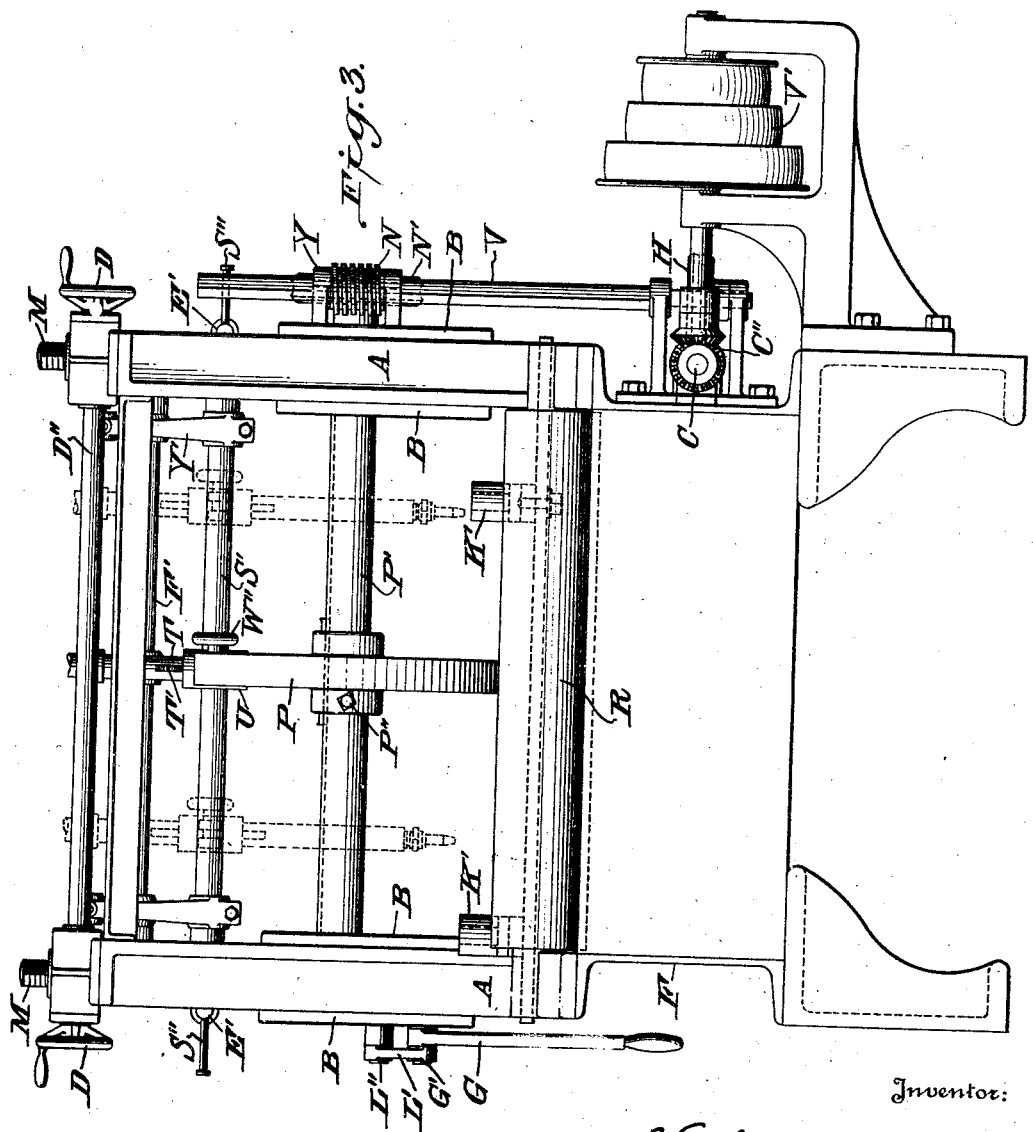

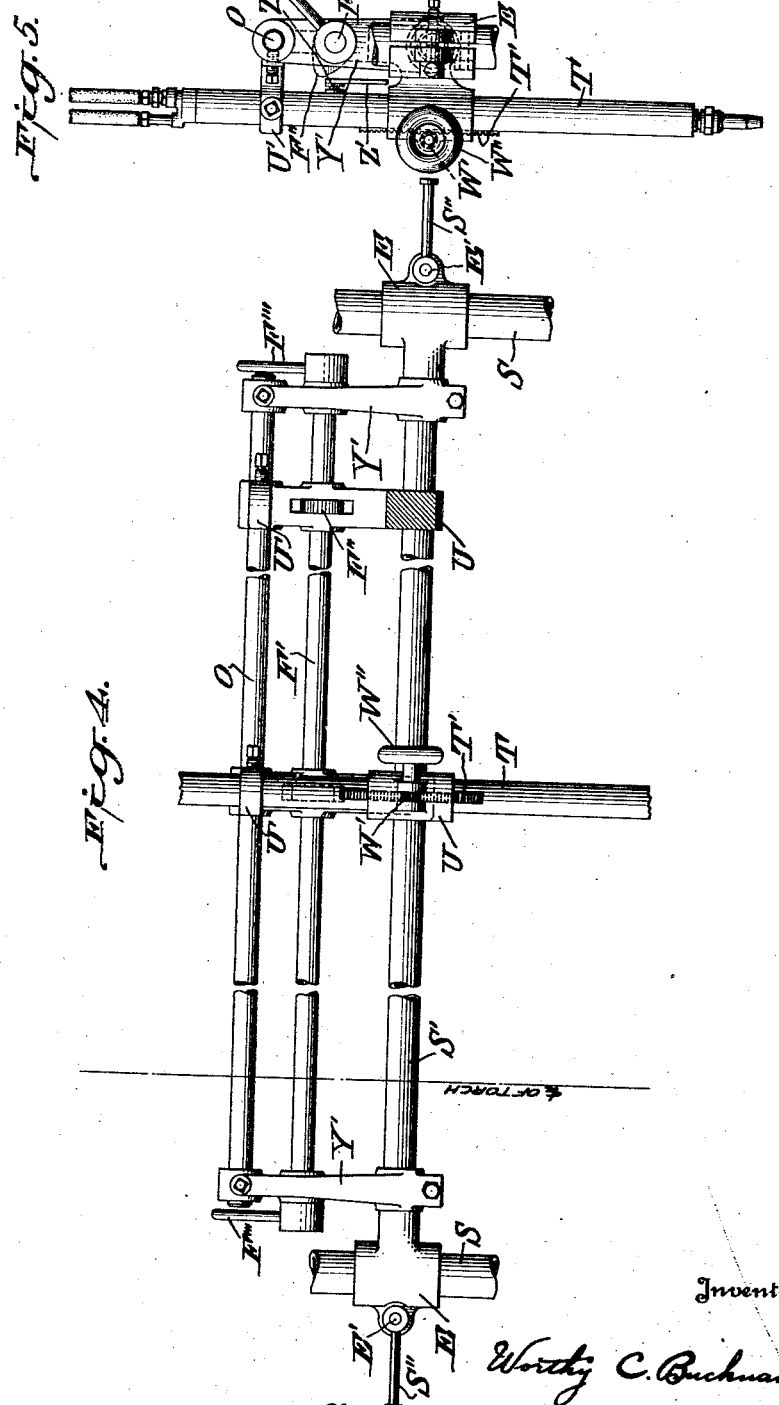

1,701,661

UNITED STATES PATENT OFFICE.

WORTHY C. BUCKNAM, OF JERSEY CITY, NEW JERSEY, ASSIGNOR TO THE LINDE AIR PRODUCTS COMPANY, A CORPORATION OF OHIO.

METAL-CUTTING MACHINE.

Application filed October 6, 1922. Serial No. 592,787.

This invention relates to metal cutting machines, and particularly to an improved straight line continuous cutting machine adapted to cut relatively long metal work such as plates, channels, beams and bars by means of an oxy-acetylene or similar flame.

Heretofore such work has been cut by advancing an oxy-acetylene torch over the same, usually by hand, which is slow and expensive. According to the present invention relatively long metal shapes and plates are cut by feeding them in a straight line past a fixed or stationary oxy-acetylene or similar blowpipe, whereby such work may be conveniently handled and rapidly and accurately cut. It will be understood that certain features of the invention disclosed may also be employed in other metal working machines such as welding machines.

The objects and advantages of the invention will be apparent from the following description taken in connection with the drawings in which Figs. 1, 2 and 3 are respectively a side elevation, a plan view and an end elevation of a metal cutting machine embodying this invention; and Figs. 4 and 5 are detail views of the torch mounting thereof.

Referring to the drawing, the machine bed comprises a frame F having a series of rollers R mounted in fixed journals thereon to horizontally support the work at a desired elevation above the floor so that such work may be propelled substantially horizontally in a straight line past the flame or cutting jet of one or more suitable oxy-acetylene or similar blowpipes T. The work supporting means as well as the means for conveying or propelling the work may be of any type adapted to continuously carry or propel the work in a straight line past the blowpipe at a fixed distance therefrom. As here shown for the purpose of illustration, the work propelling means comprises one or more continuously and positively driven pinch or feed rolls P, which are arranged to frictionally engage the upper surface of the work and positively propel it through the machine. One or more blowpipes T are adjustably carried by a stationary supporting structure S located between two successive pinch rolls, and are arranged to cut the work longitudinally as it moves through the machine and while such work is firmly held down flat by the pinch rolls on opposite sides of the cutting jet.

Each pinch roll is mounted directly above a roller R, which may or may not be positively driven as desired and cooperates with the pinch roll to grip the work and positively propel it. Each pinch roll is relatively narrow and supported so that it may be quickly raised from driving engagement with the work and also so that it may be readily adjusted to accommodate the machine to different thickness of metal. As illustrated, the pinch roll is carried by and keyed to a shaft P' along which it may be adjusted and secured by a set screw P'' to position it for engaging wide or narrow work along any line desired. More than one pinch roll may be mounted on each shaft P', if desired. The roll shaft P' is rotatably supported in a vertically adjustable bearing B that is desirably slidably mounted on vertical ways W of frames A secured to the machine frame F. The bearing slides B of each pinch roll shaft have threaded stems M projecting upwardly therefrom through internally threaded worm wheels M' meshing with worms D' on the shaft D'', which may be operated by a hand wheel D to thereby raise and lower the bearing slides B to change the fixed position of the pinch roll bearings and the shaft journalled therein.

At times it is desirable to quickly interrupt the feed of the work. This is done by means for quickly raising the pinch rolls out of engagement with the work. As shown, the journal J of the roll shaft P' is vertically movable in an opening J' in the slide B by means of a manually operable lever G and toggle links L, L'. The link L is secured to the lever G so as to move with the latter, which is pivoted at G' on the slide B. The link L' is pivotally connected to the free end of the link L and at L'' is pivotally connected to the journal J, so that the journal and roll P may be manually raised off of the work when the lever G is swung downwardly. A stop G'' limits the throw of the lever G and link L. It will be observed that the levers G for raising the two pinch rolls shown extend in opposite directions and toward the position opposite the blowpipe supporting structure so that the attendant who is watching the operation of the blowpipe may, if desired, quickly raise both the pinch rolls at the same time to interrupt the movement of the work through the machine. The pinch rolls are positively driven continuously even when raised by the levers G and are ready to be lowered into feeding engagement with the work in a moment by manipulating the levers G. A spring J'' that bears against the slide B presses downwardly on the journal J and restores the rolls P to contacting position when the free end of the lever is raised. The spring J'' also allows for a slight amount of irregularity in the thickness of the work while maintaining the pinch roll in engagement therewith.

The pinch roll shafts and pinch rolls thereon are positively driven in unison by any suitable means. As shown, suitably arranged vertical drive shafts V are severally geared to the pinch roll shafts P' through a worm N keyed thereto that meshes with a worm gear N' secured on the pinch roll shaft P', the worm N being held between the arms of a yoke Y that is secured to and moves with the adjacent bearing of the shaft P'. Suitable gearing H operatively connects each vertical shaft to a countershaft C which may be driven through gearing C'' from a pulley V' or other power means.

The supporting structure for the cutting torches T extends across the space between successive pinch rolls and may consist of a pair of posts S secured to the sides of the machine frame with a transverse bar S' extending between them carrying split clamps E at the ends thereof fitting said posts and arranged to be opened and closed by threaded pins E' operable by the handles S'', so that the bar S' which may carry one or more torches may be raised or lowered as desired. The blowpipes T are adjustable along the bar S' and relatively to each other, and may also be adjusted with respect to the work passing under them. The cross bar S' carries guides U for the torches, each guide having a pinion W' journalled thereon meshing with a rack T' on a torch and operable by a handwheel W'', whereby each torch may be raised and lowered independently of the other torches. Additional guides U' on a parallel rod O prevent the turning of the torches about the bar S' and hold them in any desired angular position relatively to the work. The rod O is carried by arms Y' adapted to be secured to the bar S' and adjustable about the axis thereof, whereby the torches may be positioned at any angle relatively to the work. The arms Y' also have a cam shaft F' journalled therein, which carries cams F'' arranged to engage and simultaneously operate the torch valves Z which for example may control the flow of cutting oxygen to the torch tips. The valves Z may have extensions Z' whereby they may be operated when the torches are in any of their vertically adjusted positions. The cam shaft may be provided with suitable operating handles F'''.

Suitable means may be employed to guide the work in the desired path, e. g. in a straight line through the machine. As shown, a guide K is desirably arranged near the entrance end of the machine and another one may be arranged between the first pinch roll and the blowpipe supporting structure. The guide K may consist of a bar having its upper surface on a level with the upper surfaces of the rollers R and has abutments K' adapted to engage the lateral edges of the work, one of such abutments being adjustable along a slot K'' in the bar K to accommodate different widths of work.

The improved method of cutting metal work and the operation of the machine will be apparent from the drawings and the foregoing description. It will be obvious that the improved machine herein disclosed is particularly adapted for accurate and rapid reproduction of cuts, since one piece of work after another may be fed through the machine while producing the same cut. It would be practically impossible to accomplish such operations with the usual hand-operated blowpipe. Various changes may be made in the details of construction without departing from the spirit of the invention.

I claim:—

1. In a metal working machine, the combination of a stationary blowpipe for projecting a jet, continuously operative means for propelling work past said jet, and means for quickly interrupting the movement of the work without stopping said work propelling means.

2. The invention claimed in claim 1 in which said interrupting means comprises a manually operable lever mounted on the machine.

3. In a metal working machine, the combination of a stationary blowpipe for projecting a jet, roller means for engaging and propelling work past said jet, and means for operating said roller means to disengage the same from the work.

4. In a metal working machine, the combination of a stationary blowpipe for projecting a jet, means for engaging and propelling work substantially horizontally and in a straight line past said jet comprising a vertically movable roll, and means for moving said roll into and out of engagement with the work.

5. The invention claimed in claim 4 in which said roll moving means comprises mechanism for changing the operative position of the roll support and other mechanism for quickly raising the roll out of engagement with the work to interrupt the movement of the work.

6. In a metal working machine, the combination of a stationary blowpipe for projecting a jet, means for propelling and guiding work past said jet comprising an axially adjustable feed roll frictionally engaging the work, and mechanism for moving said roll out of engagement with the work to interrupt the movement of the work.

7. In a metal working machine, the combination of a stationary blowpipe for projecting a flame, means for conveying work horizontally in a straight line through the machine comprising a positively driven feed roll frictionally engaging the work, and means whereby said feed roll is axially and vertically adjustable.

8. In a metal working machine, the combination of spaced rolls for engaging and propelling work through the machine, a stationary blowpipe in the space between said rolls, and means for disengaging said rolls from the work to interrupt the work movement through the machine.

9. The invention claimed in claim 8 in which said disengaging means comprises manually operable devices accessible to an attendant positioned opposite the blowpipe in the space between said rolls.

10. In a metal working machine, the combination of means for supporting work and propelling it horizontally in a straight line through the machine comprising spaced vertically movable rolls, a stationary blowpipe in the space between said rolls and arranged to project a flame upon the work passing through the machine, and means accessible to an attendant opposite said blowpipe for quickly raising said rolls to interrupt the movement of the work through the machine.

11. In a metal working machine, the combination of means for propelling work through the machine comprising spaced vertically movable rolls arranged to frictionally engage the work and propel it through the machine, blowpipe means in the space between said rolls adapted to project a flame on the work passing through the machine, and means whereby said rolls may be adjusted axially and also raised out of engagement with the work.

12. In a metal working machine, the combination with a plurality of blowpipes, of means for adjusting the same independently of one another, and means whereby they may be adjusted simultaneously.

13. In a metal working machine, the combination of means for engaging and propelling work through the machine, stationary blowpipes extending transversely of the path of movement of said work and arranged to project flames onto the work passing through the machine, and a vertically adjustable bar carrying said blowpipes.

14. In a metal cutting machine, the combination of means for propelling work through the machine comprising spaced rolls adapted to frictionally engage the work, and stationary blowpipes arranged along a line transverse to the path of movement of said work and adapted to project gaseous cutting jets upon the work passing through the machine.

15. In a metal working machine, the combination of a machine bed comprising rollers disposed to horizontally support the work, spaced rolls adapted to frictionally engage the upper surface of the work, means for lowering and raising said spaced rolls, means for driving said rolls in unison, and a blowpipe disposed in the space between said rolls and arranged to project a jet onto work passing through the machine.

16. In a metal cutting machine, the combination of means for propelling work through the machine, and a plurality of stationary blowpipes disposed along a line extending transversely of the path of movement of said work and arranged to project a plurality of cutting jets onto the work passing through the machine.

17. In a machine of the class described, the combination of means for propelling work through the machine, a plurality of blowpipes disposed along a line extending across the path of movement of said work and arranged to deliver gaseous jets onto the work passing through the machine, and means arranged to guide the work through the machine and maintain it at a substantially uniform distance from the delivery ends of said blowpipes.

18. In a metal working machine having means for controlling the work, the combination with a plurality of blowpipes having gas control valves, of means for supporting and controlling said blowpipes with respect to the work comprising means for adjusting said blowpipes independently of one another and means associated with said support for adjusting said valves.

19. In a metal working machine having means for controlling the work, the combination with a plurality of blowpipes having gas control valves, of means for supporting and controlling said blowpipes with respect to the work comprising means for adjusting said blowpipes independently of one another and means for simultaneously adjusting said valves.

20. In a machine for cutting metal plates and the like, the combination of a stationary blowpipe for projecting a gaseous cutting jet, means for conveying such plates horizontally through the machine and maintaining them at a fixed distance from the orifice of said blowpipe, and means for engaging the lateral edges of said plates to guide them past said jet.

21. A metal working machine comprising the combination of a stationary blowpipe for projecting a gaseous jet, a machine bed comprising a plurality of horizontal supporting rollers, means for conveying the work over said rollers and maintaining such work at a fixed distance from the orifice of said blowpipe, and means for guiding said work along a predetermined path past said jet.

22. A metal working machine according to claim 21 wherein said work comprises a plate or the like supported by said horizontal rollers, and such conveying means comprises propelling means adapted to frictionally engage the upper surface of such plate.

23. In a metal working machine, the combination of means for propelling work through the machine, and means located at different points transversely of the path of movement of said work and adapted to project gaseous jets onto transversely spaced portions of the work passing through the machine.

24. A metal cutting machine comprising the combination of means for propelling work through the machine, and means located at different points transversely of the path of movement of said work and arranged to simultaneously project gaseous cutting jets onto transversely spaced portions of the work to simultaneously cut the latter along parallel lines.

In testimony whereof, I affix my signature.

WORTHY C. BUCKNAM.